April 16, 1929. L. BERZON 1,708,930
ICE CREAM CONE BAKING MACHINE
Filed May 9, 1923 2 Sheets-Sheet 1

WITNESS: INVENTOR
Louis Berzon
BY
Frank L. Busser
ATTORNEY

April 16, 1929.   L. BERZON   1,708,930

ICE CREAM CONE BAKING MACHINE

Filed May 9, 1923   2 Sheets-Sheet 2

WITNESS:

INVENTOR
Louis Berzon
BY
ATTORNEY.

Patented Apr. 16, 1929.

1,708,930

UNITED STATES PATENT OFFICE.

LOUIS BERZON, OF PHILADELPHIA, PENNSYLVANIA, ASSIGNOR, BY DIRECT AND MESNE ASSIGNMENTS, TO PHILADELPHIA ICE CREAM CONE MACHINERY COMPANY, A CORPORATION OF PENNSYLVANIA.

ICE-CREAM-CONE-BAKING MACHINE.

Application filed May 9, 1923. Serial No. 637,636.

My invention relates to an improvement in ice cream cone baking machines and more especially to that type of machine adapted to be operated manually, for example, such a machine as is shown in the United States Patent No. 1,432,049, dated October 17, 1922.

In the type of hand operated cone baking machines heretofore used, the male mold members are arranged to be lifted out of the female members, after the completion of the baking operation, on a pivot, which results in the male members moving through an arc.

The arc in which the male members move is quite flat, since the center or pivot is spaced a good distance from the molds, and the arrangement is quite satisfactory. However, I have discovered that if the male mold members be lifted out of the female mold members vertically or on a straight line, the possibility of the cones being injured is eliminated and shapes varying from a true cone shape. For example, a four-sided shape with a slight taper may be produced more efficiently.

Further, in the types of cone baking machines heretofore used, there is a tendency for the finished cones to adhere to the male mold members, when they are withdrawn, with the result that a certain proportion of the product is, or may be, damaged.

Now the object of my invention is to provide an ice cream cone baking machine, of the hand operated type, wherein the male mold members will be moved out of the female members in a straight vertical line; and further to provide a machine wherein the finished cones will be prevented from whole or partial withdrawal from the female mold members because of adherence to the male mold members.

Having now indicated, in a general way, the nature, purpose and advantage of my invention, I will proceed to a detailed description of a preferred embodiment thereof with reference to the accompanying drawings, in which—

$a$, $a'$ represent a pair of standards upon which is supported, in suitable bearings, a rotatable shaft $b$. Upon the shaft $b$ are supported a pair of spaced apart plates $c$, $c'$ which serve to support separable sets of female mold members $d$, which are spaced at intervals by means of spacing blocks $e$.

Adjacent the plate $c$, at the rear of the machine, there is secured to the shaft $b$ a collar to which are secured guides $f$, extending radially from the shaft and corresponding in number and position to the sets of female mold members. Engaging and adapted to slide on the guides $f$ are members $g$ to which are secured arms $h$, which serve to carry the sets of male mold members $i$.

The plate $c'$ is provided on its forward face with forked members $j$, which are adapted to receive pins $k$ depending from the forward ends of arms $h$. Rods $l$ extend from the forward ends of arms $h$ and carry clamping members $m$ adapted to engage hooks $n$ secured to a collar secured to shaft $b$ and serve to lock the male mold members within the female mold members.

A post $o$ extends upward from support $a$ and is provided at the top with a cross-bar which serves to support the pulleys $p$, $p$.

An arm $q$ terminating in a handle $r$ is pivotally connected to a bracket $s$ secured to post $o$. The arm $q$ is connectible to the several arms $h$, which carry the sets of male mold members $j$, through a link $t$ pivotally attached to a shoe $u$ slidably engaging arcuate rail sections $v$ carried by the several arms $h$ and which together form a circular rail about the machine. The arm $q$ is counterbalanced by means of a weight $x$ which acts on arm $q$ through a cord $y$ passing over pulleys $p$, $p$.

Figure 4:
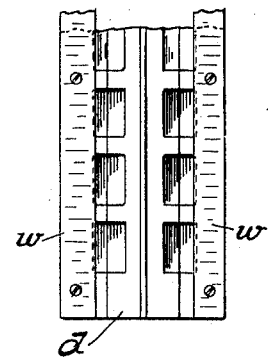
Fig. 4 is a fragmentary plan view of a set of female mold members.
Figure 5:
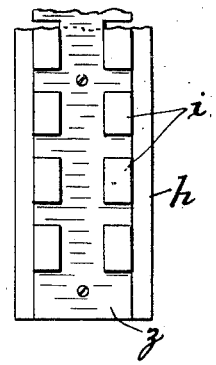
Fig. 5 is a fragmentary view looking up at a set of male mold members.
Figure 2:
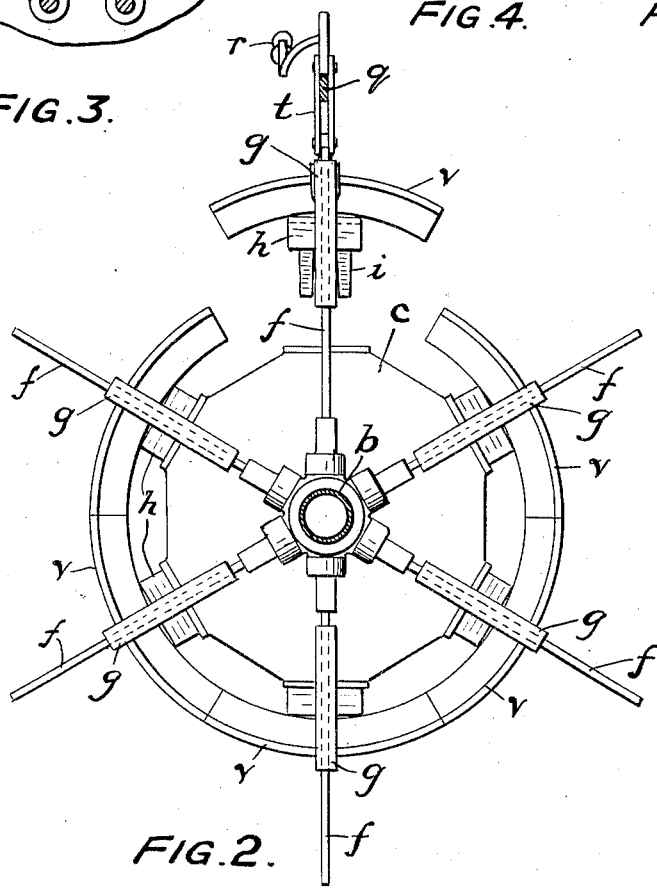
Fig. 2 is a view showing detail of construction, looking from the rear.

Strips $w$, $w$, which extend slightly over the aperture in the female mold members, are secured to the upper surface of such members, as shown in Fig. 4. A strip $z$ is secured to the underside of arms $h$ between the male mold members $j$ and acts, when the male mold members are entered in the female mold members, to fill the space between the edges of the strips *w, w.*

The operation will be understood from the following, it being appreciated that when in use the molds are rotated, reach the top of the machine and are engaged by the arm *q* successively.

Assuming now that any given set of female molds are at the top of the machine and it is desired to remove the baked cones: the clamping member *m* is released and the male mold members lifted by means of lifting arm *q*, which will be connected to the male molds through link *t*, shoe *u* and the segmented rail section *v*, by means of handle *r*. Lifting on handle *r* will cause member *g* to slide upwardly on guide *f*, and helped by the counterweight, the male mold members will rise vertically in a straight line out of the female mold members. Any tendency of the male members to be lifted on an arc will be prevented by the engagement of member *g* with the front and back edges of guide *f* as will be clear from an inspection of Fig. 1.

Figure 1:
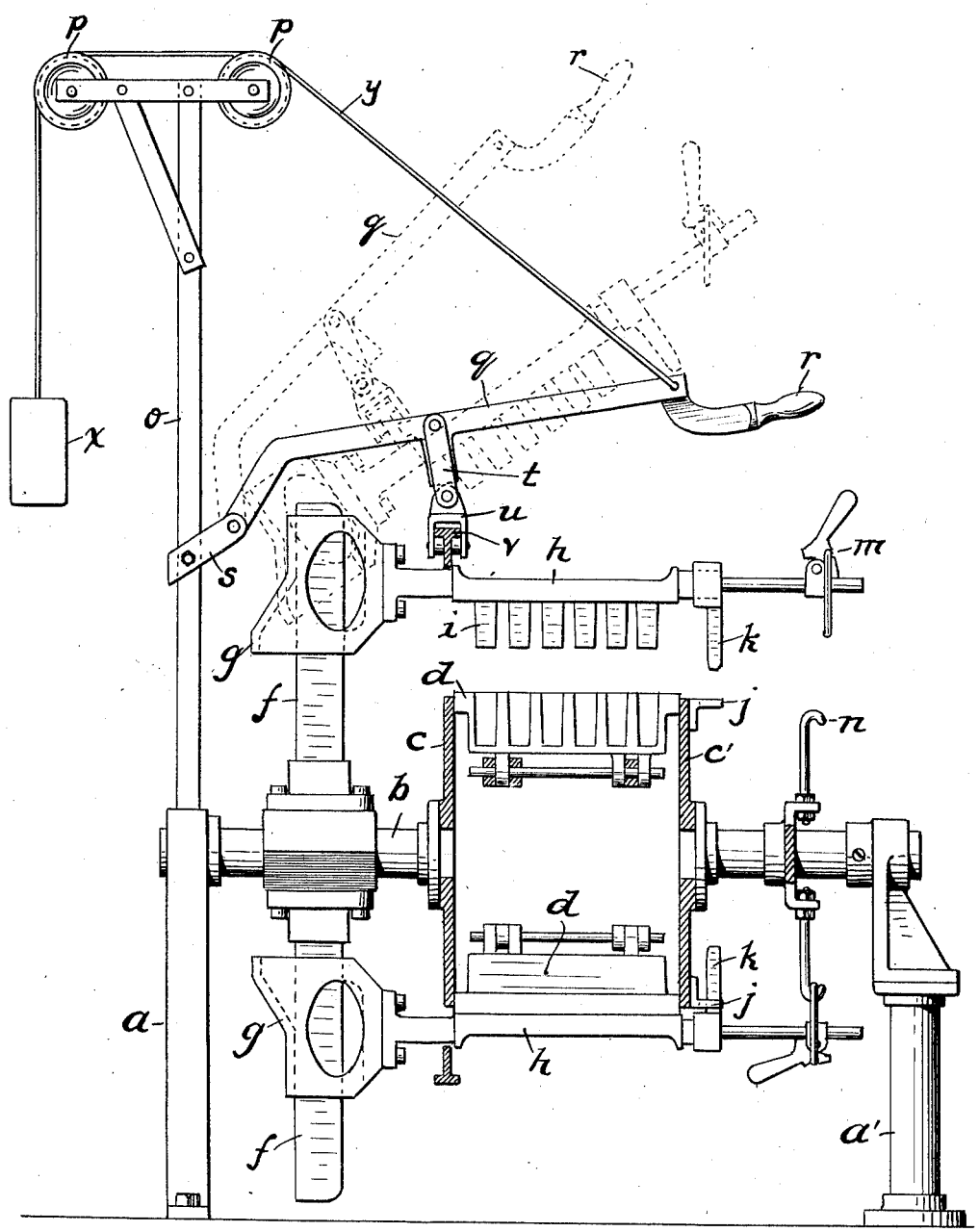
Fig. 1 is a side elevation of a machine embodying my invention, shown partly in section.
Figure 3:
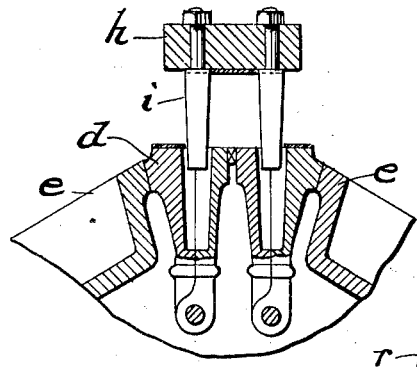
Fig. 3 is a fragmentary sectional view showing means for retaining finished cones in the female molds.

When the male members are fully withdrawn from the female members, the member *q* will have reached substantially the top of the guide *f*, as shown in dotted lines Fig. 1, and on arm *q* being further lifted it will be permitted to move on an arc, to the position shown in dotted lines, Fig. 1, in order to move the male members to a position where they will be out of the way of the operator removing the finished cones.

After removal of the finished cones and the refilling of the female members with batter, the male members are re-entered in the female members in a straight line by a reversal of the above described movement of the male members, as will be obvious.

Any tendency of the finished cones to adhere to the male mold members, during their withdrawal, is prevented by the strips *w* which lie over the upper edges of the finished cones and act, as it were, to strip them from the male members as the male members are withdrawn.

The strip *z*, when the male members are re-entered in the female members, fills the space between the edges of the strips *w* and prevent the escape of batter during its displacement by the male members on their entry into the female members.

Having now fully described my invention, what I claim and desire to protect by Letters Patent is:

1. I an ice cream cone baking machine in combination, sets of female mold members rotatable about an axis, guides arranged about and extending radially of said axis, sets of male mold members slidably engaging said guides, arcuate rail sections carried by each of said sets of male mold members, a shoe adapted to engage said rail sections successively, a pivoted lever, and a link pivotally connected to said lever and shoe.

2. In an ice cream cone baking machine, in combination, sets of female mold members arranged about an axis, sets of male mold members, guides extending radially of the axis of and adjacent an end of the female molds, shoes carried by the male mold members and slidably engaging said guides, a shoe adapted to engage said male mold members successively, a pivoted lever, and a link pivotally connected to said shoe and lever and affording a connection therebetween and whereby when said lever is swung on its pivot said male mold members will be successively lifted vertically and then angularly.

3. In an ice cream cone baking machine, in combination, sets of female mold members, sets of male mold members, strips partially overlying the female members and adapted to retain baked cones in the withdrawal of the male members, and a strip between the male members adapted to fill the space between said first mentioned strips when said male members are fully entered in said female members.

4. In an ice cream cone baking machine, in combination, sets of female mold members arranged about an axis, sets of male mold members, guides extending radially of the axis of and adjacent the ends of the female mold members, means affording a slidable connection between the male mold members and said radially extending guides, means adapted to engage said male mold members successively, a pivoted lever, and means affording a pivoted connection between said male mold-engaging means and said lever whereby when said lever is raised the set of male molds connected thereto will be lifted vertically clear of the female molds.

In testimony of which invention, I have hereunto set my hand, at Philadelphia, Pa., on this 27th day of April, 1923.

LOUIS BERZON.